June 9, 1925.
S. T. LESTER
LUBRICATING DEVICE
Filed May 23, 1923
1,540,943
2 Sheets-Sheet 1
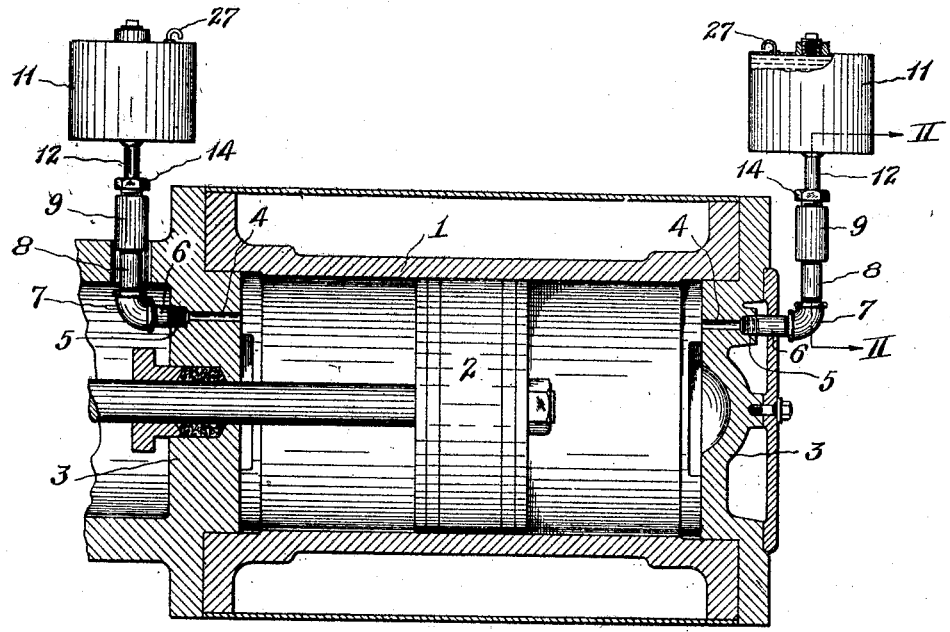
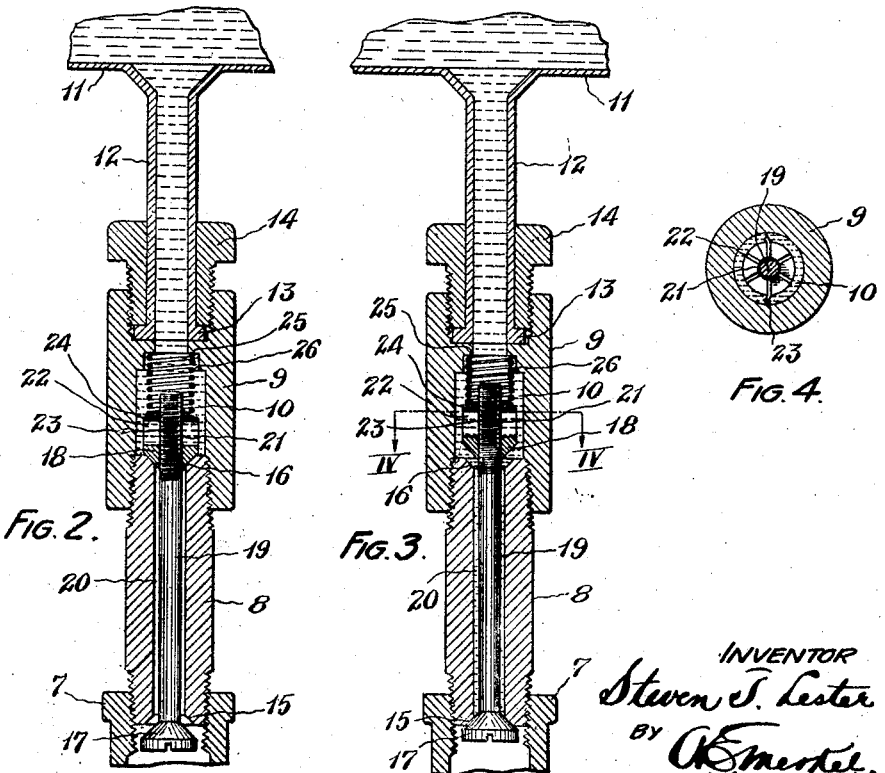
INVENTOR
Steven T. Lester
BY
C. E. Merkel,
ATTORNEY.

June 9, 1925.  
S. T. LESTER  
LUBRICATING DEVICE  
Filed May 23, 1923
1,540,943
2 Sheets-Sheet 2
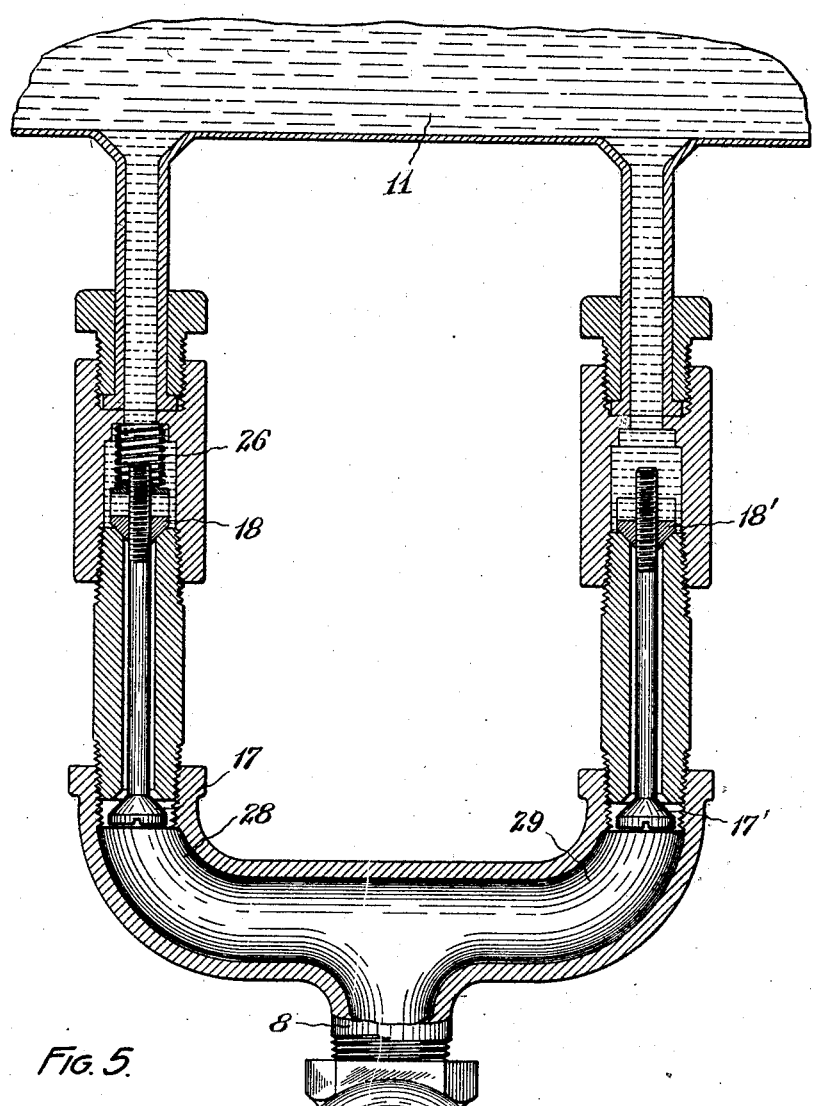
FIG. 5.
INVENTOR:
Steven T. Lester
BY
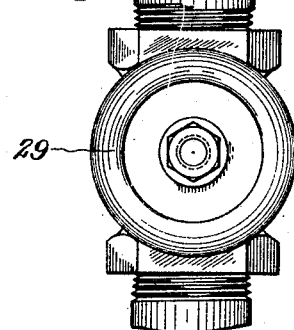
ATTORNEY.

Patented June 9, 1925.

1,540,943

UNITED STATES PATENT OFFICE.

STEVEN T. LESTER, OF EAST BAKERSFIELD, CALIFORNIA.

LUBRICATING DEVICE.

Application filed May 23, 1923. Serial No. 640,839.

*To all whom it may concern:*

Be it known that I, STEVEN T. LESTER, a citizen of the United States, resident of East Bakersfield, county of Kern, and State of California, have invented new and useful Improvements in Lubricating Devices, of which the following is a specification, the principle of the invention being herein explained and the best mode in which I have contemplated applying that principle so as to distinguish it from other inventions.

My invention relates to lubricating devices and particularly to that class thereof which is designed to supply the interior of a chamber such as a cylinder of a steam, air, gas or other similar engine or of a compressor wherein the pressure of the impelling gas or compressed gas varies.

The object of the invention is to provide lubricating mechanism which will automatically and efficiently operate, which will supply a definite predetermined amount of lubricant and which will further be capable of adjustment whereby the amount of such lubricant so supplied may be varied to suit specific conditions.

My said invention consists of means hereinafter fully described and particularly set forth in the claims.

More specifically my invention comprises means connecting a supply of lubricant with the interior of such chamber, such means being controlled by the variation of pressure in the latter.

The annexed drawings and the following description set forth in detail certain means embodying my invention, the disclosed means, however, constituting but one of various ways in which the principle of the invention may be applied.

In said annexed drawings:

Fig. 1 represents an axial section of a steam engine cylinder, showing the piston in elevation therein, said cylinder being supplied with lubricating devices embodying my invention and shown in side elevation.

Fig. 2 represents a section, upon an enlarged scale taken upon the plane indicated by line II—II in Fig. 1 and looking in the direction indicated by the arrows.

Fig. 3 represents a view similar to that of Fig. 2 showing the parts in a different position.

Fig. 4 represents a cross-section taken upon the plane indicated by line IV—IV in Fig. 3.

Fig. 5 represents an axial sectional view of the lubricator arranged for supplying a locomotive cylinder with lubricant when either pulling, coasting or drifting.

In the illustrated embodiment of my invention as shown in Figs. 1 to 3 inclusive, the steam cylinder 1 has each end provided with a lubricating device embodying my invention, so as to supply the interior of the cylinder with lubricant upon opposite sides of the piston 2 each being a duplicate of the other and operating independently of each other but in precisely the same way. Each cylinder head 3—3, is provided with a horizontal duct 4 whose outer end 5 is enlarged and tapped to receive a nipple 6. This nipple has screwed onto its outer end an elbow 7 into which is screwed a vertical nipple 8. To the upper end of nipple 8 is screwed a coupling 9 formed with an interior chamber 10. The upper end of this coupling is connected with an oil tank 11 by means of a downwardly extending tube 12 whose lower end is provided with a flange 13 secured to the coupling 9 by means of a gland 14 to make an oil-tight connection.

The opposite ends of the nipple 8 are formed with valve-seats 15 and 16 respectively, Fig. 2, and with these seats co-operate valves 17 and 18 respectively, these valves being mounted on a common stem 19 of smaller diameter than the interior duct 20 of the nipple. The upper end of the stem 19 is threaded as at 21 and the valve 18 is tapped to engage these threads, thereby permitting said valve to be adjusted relatively to valve 17. The upper end of valve 18 is provided with a multiplicity of transverse slots 22, any one of which may be intersected by a cotter-pin 23 passing through a suitable hole drilled in the upper end of said valve-stem as shown in Fig. 4, thereby permitting said valve to be fixed in position on said stem. These two valves are so adjusted that when the one valve occupies its closing position the other will occupy its opening position, as shown in Figs. 2 and 3.

Seated upon the upper side of valve 18 is a washer 24 and interposed between said washer and the upper end 25 of the chamber 10 is a helical or coil-spring 26 which urges or tends to urge the valve 18 and its attached parts downwardly so as to seat said valve upon the valve-seat 16.

The oil tank is provided with a suitable vent 27 as shown in Fig. 1, to provide for atmospheric pressure upon the oil's upper surface.

The above described devices operate as follows:

Referring to but one of the devices, let it first be assumed that the engine is not operating and no steam is being admitted into the cylinder. In such event pressure in such cylinder on the corresponding side of the piston will be less than that of the pressure of the spring 26, and valve 18 will close the upper end of the duct 20. Access of lubricant from the tank to the interior of the cylinder is thus cut off. When steam is admitted into said side of the cylinder to move the piston, the pressure increases and raises valve 18 off its seat thus closing the lower end of duct 20 by causing the valve 17 to engage its seat 15. Oil thereupon flows from the tank into the duct 20 around the stem 19. During the course of the continued travel of the piston in the cylinder the pressure therein and on said side of the piston decreases until it reaches a point where the spring pressure exceeds that of the steam and the upper end of the duct 20 will be closed and the lower end opened thereby permitting the oil in the duct to be discharged into the interior of the cylinder as required. The pressure of the spring is sufficient to overcome the pressure in the cylinder during the exhaust and the valve 18 will remain closed during such exhaust.

By adjusting the relationship to each other of the two valves, it will be seen that the amount of oil admitted into the duct 20 may be regulated and therefore varied so that just the required amount of oil for proper lubrication of the cylinder may be supplied.

The device as above described is especially adapted for use in connection with an engine cylinder in which the pressure of the impelling steam or other gas is largely in excess of atmospheric pressure and in so far, therefore, as relates to a locomotive, it is adapted especially for lubricating the cylinders when the locomotive is pulling. In order, therefore, to economically and properly lubricate a locomotive or other cylinder when the pressure on either side of the piston falls below that of the atmosphere, as for instance when the locomotive is coasting or when the piston is idling, during which operation the pressure in the cylinder falls below that of the atmosphere, I have found it advantageous to utilize the construction shown in Fig. 5 at each end of the cylinder. In this construction I provide the connection 8 with two branches 28 and 29. To the one branch 28 I attach the previously described lubricating device as shown. To the other branch 28 I attach a lubricating device constructed exactly the same as the said described device but omit the spring 26, as shown in said figure. A common tank 11 may be provided for supplying lubricant to both of these devices by means of separate ducts as shown or, as will be readily understood, a single duct may be caused to lead from the tank with branches leading to each of the lubricating devices.

The last described device, therefore, will operate as follows:

When the locomotive is pulling the lubricator supplied with a spring 26 and attached to the branch 28 will operate exactly as described in connection with Figs. 1 to 3 inclusive, and the valve 17' of the lubricator connected with the branch 29 will remain constantly closed, the weight of this valve and the attached parts being such as will be overcome by the pressure in the cylinder during both the feed and exhaust of the steam. When, however, the locomotive is drifting or coasting, valve 18 of the spring-actuated lubricator will remain constantly closed but inasmuch as during such drifting or coasting the pressure in the cylinder falls below that of the atmosphere, the valve 17' will open and the valve 18' will close once for each cycle of the piston thus admitting lubricant into the cylinder in the same manner as described in connection with said Figs. 1 to 3.

If desired a valve 30 may be interposed in the connection 8 so as to shut off the lubricating device completely from the cylinder.

When this device is used for lubricating the cylinder of an air compressor, the spring 26 may also be dispensed with, inasmuch as the reduction of pressure below that of the atmosphere, during the one stroke, will cause the lubricator to operate, as will be readily apparent to those skilled in the art.

It will be noted that a definite and predetermined amount of lubricant is admitted into the cylinder, the total amount of lubricant is directly proportionate to the number of strokes of the piston, and hence may be measured with substantial accuracy.

What I claim is:

In a lubricating device, the combination of a source of lubricant provided with two outlets; each of said outlets having one end of a coupling attached thereto, each of said couplings forming an interior chamber; two nipples respectively secured to the other ends of said couplings; a duct having two branches, one of each of which is secured to the other end of said nipples respectively; and two valve stems respectively passing through said nipples, each of said stems having a valve member secured to opposite ends thereof and arranged so that when one valve is open the other is closed; one only of said chambers having a spring seated therein adapted to exert pressure upon the corresponding movable valve member and tending to actuate same to assume its closed position.

Signed by me this 30th day of April, 1923.

STEVEN T. LESTER.